United States Patent [19]
Graber

[11] 3,759,054
[45] Sept. 18, 1973

[54] SPLIT SHUTTER CONTROL SYSTEM
[75] Inventor: Walter P. Graber, Cadillac, Mich.
[73] Assignee: Kysor Industrial Corporation, Cadillac, Mich.
[22] Filed: July 3, 1972
[21] Appl. No.: 268,486

[52] U.S. Cl............ 62/183, 165/23, 49/21, 49/31, 236/35.3, 62/181, 62/182, 62/184
[51] Int. Cl............................................. F25b 39/04
[58] Field of Search.............. 165/23, 43, 101; 62/181, 182, 183, 184; 49/21, 31, 77, 80; 236/35.2, 35.3; 98/121

[56] References Cited
UNITED STATES PATENTS

| 2,318,893 | 5/1943 | Smith | 62/183 |
|---|---|---|---|
| 2,455,421 | 12/1948 | Kirkpatrick | 62/181 |
| 2,958,208 | 11/1960 | Broden | 62/181 |
| 3,004,402 | 10/1961 | Dart | 62/183 |
| 3,148,514 | 9/1964 | Mathis | 62/183 |
| 3,543,838 | 12/1970 | White | 165/23 |

Primary Examiner—William J. Wye
Attorney—Peter P. Price et al.

[57] ABSTRACT

A shutter assembly including a plurality of louvers shiftable between open and closed positions for controlling air flow over radiator and condenser elements in a vehicle. The shutter assembly is divided into two independently operable louver sections or shutter means, one of which is operated to control air flow over the condenser while the other is operated with the first to control air flow over the radiator. A pair of actuator elements responsive to engine temperature control both sections. Valve means associated with one of the actuators is responsive to operation of the vehicle air conditioner compressor to open the louvers covering the condenser a limited amount controlled by cooperative stop means and stop abutment means between the two shutter means when the entire louver assembly is closed.

14 Claims, 5 Drawing Figures

SPLIT SHUTTER CONTROL SYSTEM

BACKGROUND OF THE INVENTION

Engine temperature control requirements in heavy duty vehicles are commonly satisfied by means of a shutter assembly mounted on the front of the vehicle adjacent the radiator. In vehicles having an air conditioning unit, the air conditioner condenser may be placed adjacent the radiator such that the louver assembly controls air flow over the radiator and the condenser. One such prior art shutter control assembly is illustrated in U.S. Pat. No. 3,543,838, issued on Dec. 1, 1970 to J. H. White and entitled COOLING SYSTEM FOR VEHICLE COMPARTMENT wherein two sets of louvers are utilized. A first set of louvers is shiftable between closed and opened positions to control the air flow over the radiator. A pressure cylinder connected in series with a fluid conduit between the air conditioner compressor and condenser operates the second set of louvers with changes in the pressure in the system. Such pressure operated cylinders, however, are relatively expensive. Further, as pressure in the system changes, the shutters tend to oscillate between open and closed positions. When pressure is high, the louvers are completely open thereby allowing extreme air flow over both the condenser core and also that portion of the radiator associated therewith. When engine temperature requirements are such that the radiator requires heating and the air conditioner is operating, complete opening of that portion of the shutter assembly over the condenser allows too much air flow over the radiator, thereby being detrimental to engine temperature control requirements. The operating components including temperature and pressure sensors, biasing means for the control elements and the various pressure controls required for the actuators are quite complex, costly, and require separate pressure sources. The large number of components are subject to malfunction which can result in costly "downtime" of the vehicle.

SUMMARY OF THE INVENTION

The present invention provides a split shutter assembly having a pair of independently operable actuator elements which are operated from a single source of fluid pressure. A first actuator responsive to engine temperature operates the entire louver assembly, while a second actuator responsive to the operation of an air conditioner compressor, operates to open the shutters associated with the condenser a controlled amount sufficient to provide for condenser cooling requirements without adversely affecting engine temperature control requirements.

The present invention, therefore, relates to an apparatus for providing air flow over an air conditioner condenser core assembly simultaneously with providing for engine cooling and heating requirements. The condenser core is mounted on the vehicle in the vicinity of the radiator, and is normally mounted adjacent the radiator. The condenser may form the grill of the vehicle, it may be positioned between the shutter assembly and the radiator, or it may be positioned behind the radiator, depending upon the particular design requirements of the vehicle.

The shutter assembly includes a pair of independent control bars for controlling the louvers. A gap of predetermined dimension between the ends of the bars is provided to allow controlled limited opening of that portion of the shutter assembly controlling air flow over the condenser. Air flow over the condenser and radiator is controlled by a first actuator which allows the portion of the shutter covering the condenser to open a limited amount in response to air conditioner operation. The second actuator operates the entire shutter assembly and overrides the first to meet the demands of the engine cooling system. The actuator responsive to engine temperature is the primary control unit and will always provide for engine temperature control requirements regardless of the condition of the other actuator element.

Accordingly, it is an object of this invention to provide a novel split shutter control system.

It is another object of this invention to provide an air control system which operates to satisfy the cooling requirements for both the engine radiator and the air conditioning condenser.

It is another object of this invention to provide a shutter control system for providing air flow over a condenser by allowing only that portion of the shutter assembly covering the condenser to open a limited amount to allow air flow over the condenser without adversely affecting overall engine temperature control.

It is yet another object of this invention to provide air flow over the air conditioner condenser core by allowing the shutter assembly associated therewith to open a limited amount which is sufficient to provide condensing but not enough to be detrimental to engine temperature control.

These and other important objects and novel features of the present invention will become readily apparent to those skilled in the art upon reading the following description with reference to the accompanying drawings illustrating a preferred embodiment of the invention.

DESCRIPTION OF THE PREFERRED EMBODIMENT

Figure 1:
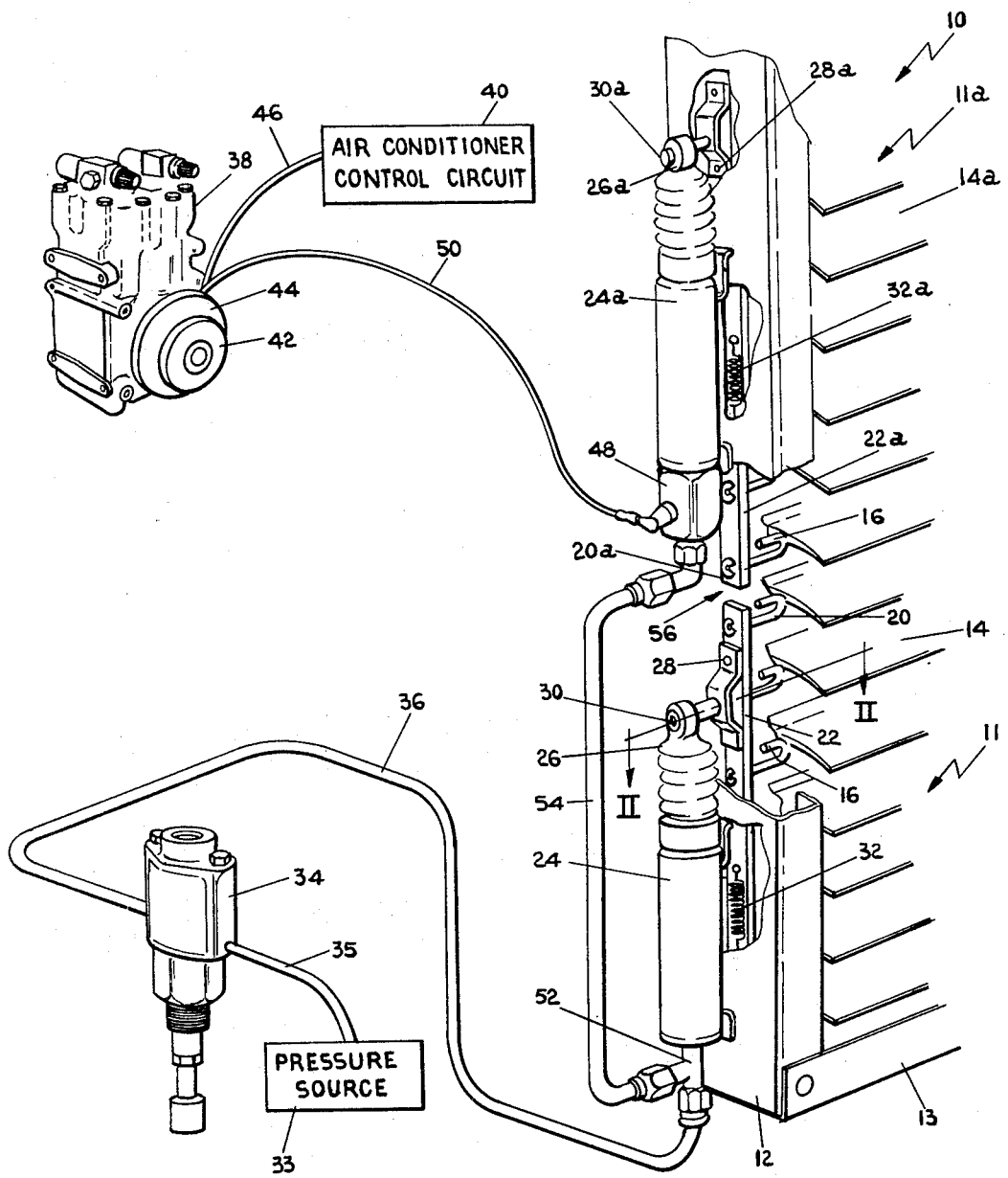
FIG. 1 is a perspective and partially schematic view of a first embodiment of the split shutter control system of the present invention.
Figure 2:
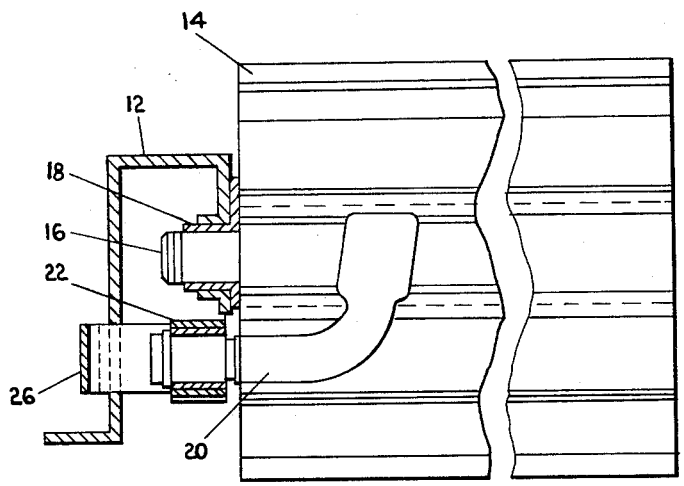
FIG. 2 is a cross-sectional view taken along the plane II—II of FIG. 1 illustrating a typical shutter mounting arrangement.
Figure 3:
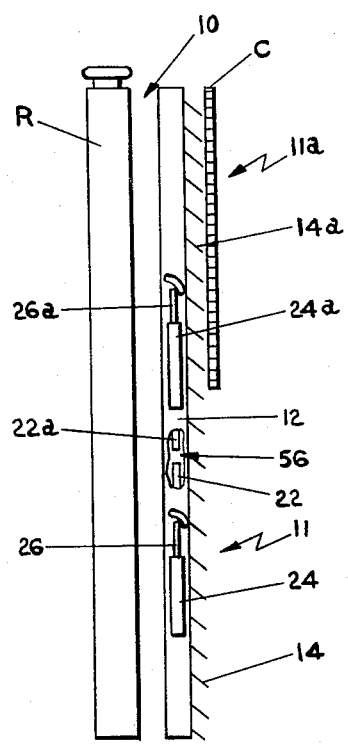
FIG. 3 is a diagram illustrating the mounting of the radiator and condenser elements with respect to the shutter assembly.

Referring now to FIGS. 1 through 3 of the drawings, a first embodiment of the shutter control assembly of the present invention will be described in detail. The shutter assembly part of this system is slightly modified from the conventional shutter assembly. For a detailed discussion of the construction and operation of one such conventional shutter assembly, reference may be had to commonly assigned U.S. Pat. No. 3,198,298 entitled SHUTTER AND SLAT MOUNTING, issued on Aug. 3, 1965 to D. R. Ferris.

Shutter assembly 10 includes a rectangular framework having opposed side walls 12 and end walls 13 which are attachable to enclose the grill or other opening in front of an automotive vehicle. A plurality of louvers or shutters 14 are pivotally mounted in the framework by means of pintles 16 extending from opposite ends of the louvers. Pintles 16 are received in bearings 18 fixed in side walls 12. Pintles 16 on one side of each louver 14 are associated with eccentric crank arms 20 connected to a control bar 22.

The shutter 10 is divided into two separate operable sections or shutter means 11 and 11a, each section including a plurality of louvers, a control bar and an actuator. The parts are identical in construction and for convenience, those associated with the upper portion of the assembly will bear the same reference numerals as those of the lower but will include the suffix letter "a." Generally, the radiator R (FIG. 3) is associated with the entire surface area of the shutter assembly, while the air conditioner condenser C is arranged to cover only a portion of that area. In the first embodiment, condenser C is associated with the upper portion of the shutter assembly, i.e., the components bearing the suffix letter "a."

Each of the operative sections 11 and 11a is seen to include louvers 14 and 14a, control bars 22 and 22a, and actuators 24 and 24a respectively. Each actuator 24 includes an extendable and retractable piston rod 26 which is operatively connected to control bar 22 by means of a drive block 28 having an outwardly extending stud 30. The stud forms a pivotal connection with the extended end of piston rod 26. Suitable biasing means such as springs 32 and 32a are connected to the control bars and the supporting framework to shift the control bars and hold the louvers in a normally open position. The general construction of such louver assemblies is well-known and reference may be had to the above-mentioned U. S. Pat. No. 3,198,298 for a detailed discussion thereof.

Normally, the louvers and control bars are biased into the open position by springs 32 to allow air flow through the louvers. Movement of the shutters toward a closed position is accomplished through the use of a control valve means 34 which operates to connect a source of fluid pressure 33 to the actuators 24. Control valve 34 is a thermally responsive valve mounted on the block or head of an internal combustion engine to sense the temperature in the cooling jacket of the engine. The fluid pressure source is connected through control valve 34 to actuators 24 by means of conduits 35 and 36. Valve means 34 controls the admission of fluid pressure from source 33 which may include a pump or the like operated by the vehicle engine, to operate the actuators 24 to shift the louvers to a closed position. A suitable thermostatic control valve which may be utilized in the practice of this invention is illustrated in commonly assigned U. S. Pat. No. 1,135,495 entitled THERMOSTATIC CONTROL VALVE issued to D. R. Ferris on June 2, 1964. The valve is normally open, allowing the passage of fluid pressure therethrough. When the valve senses a predetermined engine temperature, it shifts to a closed position, blocking the flow of fluid pressure from the source through conduit 36 to the actuators.

The improved shutter control system of the present invention includes the provision of a second actuator 24a acting on control bar 22a to open shutter means 11a, which is the upper portion of the shutter assembly, a limited amount to provide for condenser cooling.

When the shutters are in open position, control bars 22 and 22a are spaced from each other by a slight gap 56 (FIGS. 1 and 3). This gap spacing is of a predetermined dimension to allow movement, when the shutters are closed, of control bar 22a until it abuts control bar 22 to thereby cause only limited opening of shutters 14a as will be more fully described hereinafter. The end of control bar 22 thus forms a stop means which is operative only when shutter means 11 is closed, while the abutting end of control bar 22a forms a stop abutment means on the second shutter means 11a. The second actuator 24a is operated when the vehicle air conditioner compressor 38 operates.

Compressor 38 operates in the air conditioning system for the vehicle in a conventional manner through suitable control circuits 40 located in the vehicle. The compressor is driven by any suitable drive means as, for example, the vehicle engine by means of a "V" belt or the like (not shown) connected to a pulley wheel 42, which in turn is operatively connected through a clutch mechanism 44 to the compressor. Clutch 44 is preferably an electromagnetic clutch which is actuated and deactivated through suitable wiring 46 connected to the control circuits 40 to shift the drive means into engagement with the compressor.

A normally open solenoid valve 48 connected to the pressure inlet of actuator 24a is electrically operated by a signal through electrical wire 50 connected to the electrical system for operating clutch 44. Operation of clutch 44 in response to air conditioning demands therefore causes a corresponding operation of solenoid valve 48, shifting it to a closed position.

The actuator members 24 and 24a may be identical air cylinders, each having pistons 26 and 26a therein movable in response to pressurized fluid. Air cylinders suitable for use in the practice of this invention are commercially available from Kysor of Cadillac, Division of Kysor Industrial Corporation, Cadillac, Michigan, under their part number 1017-21550-01. The normally opened solenoid valve is also available from Kysor of Cadillac under their part number 1017-32140-01. It is recognized, of course, that suitable hydraulic or electromechanical actuator mechanisms and valves can be used with equal facility.

The actuators 24 and 24a are operated simultaneously by fluid pressure from source 33 and conduit 35 through control valve 34. A "T" 52 is provided at the connection of line 36 to actuator 24 and a second conduit 54 connected to the "T" extends through normally opened solenoid valve 48 to actuator 24a. Normally, when air conditioning compressor 38 is not operating, solenoid valve 48 is open, thereby allowing the flow of pressurized fluid through lines 36 and 54 to actuator 24a. Simultaneously, pressurized fluid in line 36 is applied to actuator 24, causing both actuators to operate in unison, extending the piston rods 26 and 26a and shifting control bars 22 and 22a equally to cause the louvers 14 and 14a to close.

OPERATION

When the shutters 14 and 14a are in their normal position, biased open, as the engine is started with the air conditioner control turned off, clutch 44 is not energized and solenoid valve 48 is open. The shutters 14 and 14a then operate in a conventional manner. That is, if the engine requires heating, it is sensed by the control valve 34, causing it to open and allow fluid pressure flow from source 33 through valve 34 and conduits 36 and 54 to actuators 24 and 24a. This causes piston rods 26 and 26a to extend simultaneously, shifting control bars 22 and 22a, thereby closing shutters 14 and 14a. When engine operating temperatures are reached, valve 34 closes, cutting the fluid pressure supply to the actuators 24 and 24a and the shutters are biased to open position by springs 32 and 32a. In this manner, the flow of air through the shutters is controlled in response to engine temperature.

As long as there is no demand for cooling air over the condenser, the system will continue to operate as hereinabove described. If the shutters are closed, however, and the air conditioning system is turned on, solenoid valve 48 is energized simultaneously with operation of clutch 44 by means of an electrical input through line 46 to the clutch assembly and line 50 to the solenoid 48. This shifts solenoid valve 46 to closed position, blocking the flow of fluid pressure in line 54 to actuator 24a. Accordingly, bias spring 32a operates on control bar 22a to urge the louvers 14a toward their normally open position. The louvers 14a, however, will not open their entire amount since gap or space 56 is provided between control bar 22 and control bar 22a. This gap 56 is of a controlled distance such that the biasing force of spring 32a acting on actuator bar 22a will pull bar 22a downwardly until it abuts actuator bar 22. In a preferred embodiment of the invention, the gap 56 is approximately one-quarter of one inch, thereby allowing louvers 14a to open approximately one-quarter of 1 inch. This limited opening is sufficient to cool the condenser, yet it is not large enough to significantly affect radiator heating. It will be recognized that variations in the size of the gap 56 can be made to allow more or less opening of louvers 14a to provide greater or lesser cooling air to pass over the condenser.

If the engine radiator requires cooling while the air conditioner is operating, valve 34 closes, cutting the source of pressure in both lines 36 and 54 thereby allowing shutters 14 to return to their normal open position by bias spring 32 operating on control bar 22. As control bar 22 moves downwardly, control bar 22a is simultaneously moved downwardly by the force of bias spring 32a. Cylinder 24a has previously been de-energized with closing of solenoid valve 48. Both sets of louvers 14 and 14a are then in their normal biased open position. Should the air conditioning system be turned off, shifting of solenoid valve 48 to an open position will have no effect on cylinder 24a. This is because there is no fluid pressure in lines 36 and 54 as control means 34 has previously been shifted to an off position, blocking the flow of pressurized fluid.

ALTERNATE EMBODIMENT

Figure 4:
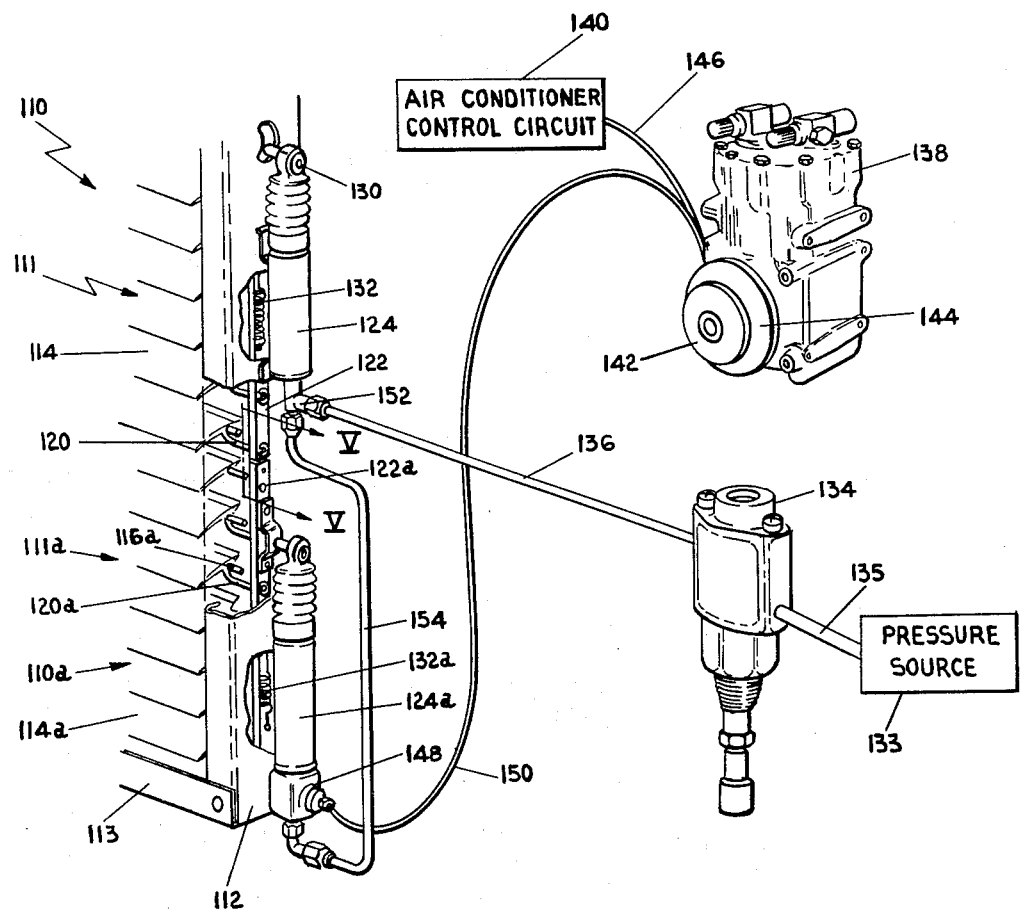
FIG. 4 is a perspective view similar to FIG. 1 illustrating a modified embodiment of the invention.
Figure 5:
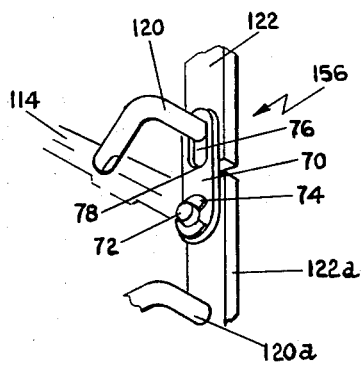
FIG. 5 is an enlarged perspective view as viewed along the plane V—V of FIG. 4.

In an alternate embodiment of the invention, shown in FIGS. 4 and 5, the radiator is associated with the entire surface of the shutter assembly but the condenser is associated only with the lower portion of the shutter. The actuator elements, therefore, are arranged in reverse order from that shown in the previous embodiment, i.e., the actuator having the solenoid valve responsive to air conditioner operation is positioned to control the louvers associated with the lower portion while the actuator responsive to engine temperature is arranged to operate the shutters at the upper portion of the shutter assembly. Most of the operating components are like those previously described. A detailed discussion of all the same components is therefore not believed necessary. Accordingly, in FIG. 4, a minimum number of reference numerals are indicated wherein, for convenience, the similar components identified in FIGS. 1 through 3 are prefaced by the numeral 100 and the components associated with the condenser portion bear the suffix letter "a." Only the components peculiar to this embodiment will be described in detail.

Each of the operative sections, 111 and 111a, includes louvers, control bars, and actuators as previously described. The condenser C is associated only with the lower portion of the assembly where the operation of associated louvers 114a are controlled by actuator 124a. Bias springs 132 and 132a are connected to control bars 122 and 122a and to the frame to hold the louvers in their normally open position. The shutters are shifted to their closed position by fluid pressure connected from source 133 through valve means 134 to the actuators 124 and 124a via conduits 135, 136 and 154.

A normally open solenoid valve 148, connected to the pressure inlet end of actuator 124 is electrically connected and controlled with operation of the air conditioner compressor 138.

Referring to FIG. 5, control bars 122 and 122a are shown in the position assumed when actuator 124 is operated to close louvers 114 in response to engine heating requirements. Actuator 124 has been de-energized by the closing of solenoid valve 148 in response to operation of air conditioner compressor 138.

In this embodiment, the stop means and stop-abutment means formed between control bars 122 and 122a and gap 156 is slightly modified to control movement of lower control bar 122a when it shifts to allow louvers 114a to open when solenoid valve 148 is closed.

The modification includes a lost motion linking member 70 which is fixed on control bar 122a as by a stud 72 fixed to the control bar and passing through one end of the link where it is held by a keeper 74. The opposite end of the lost motion link is provided with an elongated slot 76 through which extends the lowermost crank arm 120 connecting control bar 122 to louvers 114 on the upper louver assembly. The slot 76 is slightly wider than the diameter of crank arm 120 so that it is freely movable as the control bars are moved with respect to each other and as the lost motion link moves with respect to crank arm 120.

When the louvers in both operative sections are simultaneously moved to either open or closed positions, the control bars move together and the position of crank arm 120 in slot 76 of the lost motion link abuts or is closely adjacent the lowermost portion 78 of the slot.

The length of slot 76 is of a predetermined dimension to allow movement, when all shutters are closed, of control bar 122a with respect to control bar 122. When the air conditioner compressor is energized, valve 148 closes, blocking fluid pressure flow to actuator 124a. Bias spring 132a causes control bar 122a to move downwardly and open louvers 114a. Link 70 moves downwardly with bar 122a until arm 120 abuts the uppermost end of slot 76 which prevents further movement and allows the shutters to open a limited amount. Link 76 forms an extension of the end of control bar 122a. It cooperates with crank arm 120 to form a cooperative stop means and stop-abutment means which is operative only when shutter means 111 is closed. This controls the amount of opening of louvers 114a to satisfy the cooling requirements of the condenser when compressor 138a is operating. Generally, louvers 114a are allowed to open about one-quarter of 1 inch which is sufficient to cool the condenser but not enough to significantly affect radiator heating. It will be recognized that variations in the length of slot 76 can be used to allow more or less opening of louvers 114a to thereby provide more or less cooling air to pass over the condenser.

In all phases of operation, then, the actuator 24 or 124 is the primary control and will always respond to engine cooling requirements. As long as the air supply is blocked by valve 34 or 134 the louvers are open, and the actuator associated with the louvers covering the condenser does not operate on the louvers at all. It is only when both sets of louvers are closed by fluid pressure in both actuators that actuator 24a or 124a can be deenergized by operation of the solenoid valve to a closed position to block the supply of fluid pressure to actuator 24a or 124a and thereby cause a slight opening of the condenser louvers with the bias spring to provide for condenser cooling requirements. This occurs only when the clutch is energized and the compressor is operated.

While a preferred and alternate embodiment of this invention has been illustrated and described, it will be apparent to those skilled in the art that other embodiments and modifications of the invention incorporating the teachings hereof may be readily made in light of this disclosure. All modifications embodying the principles of this invention are therefore considered as included in the appended claims unless these claims by their language expressly state otherwise.

The embodiments of the invention in which an exclusive property pr privilege is claimed are defined as follows.

1. An air flow control assembly for a vehicle having a radiator for cooling the engine of the vehicle and an air conditioning system including a compressor and a condenser, said air flow control assembly including:
 first and second shutter means, each said shutter means being normally biased toward an open position;
 first and second actuator means for said first and said second shutter means for shifting said shutter means to a closed position;
 first control means connected to said first and said second actuator means for closing said first and said second shutter means until the vehicle engine has reached a predetermined temperature; and
 second control means for said second actuator, said second control means disabling said first control means with respect to said second actuator to thereby allow said second shutter means to return to open position.

2. The assembly in claim 1 including limit means adapted to limit the opening of said second shutter means a controlled amount when said first shutter means is closed.

3. The assembly in claim 2 wherein said limit means has cooperative components between said first and second shutter means.

4. The assembly in claim 3 wherein said components include stop means on said first shutter means operative only when said first shutter means is closed, and stop abutment means on said second shutter means engageable with said stop means when the latter is operative.

5. The assembly of claim 3 wherein said components include a lost motion linking means on one of said first and said second shutter means and stop means on the other of said first and said second shutter means, said stop means and said lost motion linking means being operative to limit the opening of said second shutter means when said first shutter means is closed.

6. The apparatus of claim 5 wherein said lost motion linking means is connected to said second shutter means and said stop abutment is on said first shutter means.

7. The air flow control assembly of claim 1 wherein said radiator is positioned in the flow path of air passing through said first and said second shutters and said condenser is positioned in the flow path of air passing through said second shutter.

8. The air flow control system of claim 7 wherein said first and said second actuators are operated by fluid pressure and further including means for connecting said actuators to a source of pressure, and wherein said first control means includes a valve means in said connecting means for controlling the flow of fluid pressure to said first and said second actuators, said valve means being normally open allowing pressurized fluid flow therethrough to said first and said second actuators to close same, said first control means shiftable to a closed position to block the flow of pressurized fluid to said first and said second actuators when the engine reaches a predetermined temperature to thereby allow said first and said second shutters to return to said normally open position.

9. The air flow control apparatus as defined in claim 8 wherein said second control means comprises a normally open valve operatively connected to said compressor, said normally open valve being shiftable to a closed position in response to operation of said compressor to block the flow of fluid pressure to said second actuator thereby allowing said second shutter to return to open position and allow the flow of air through the condenser.

10. The apparatus of claim 9 wherein said first control means is a thermally responsive valve and said second valve means is a normally opened electrically operated solenoid valve; and further including electrically operated clutch means on said compressor; and means electrically connecting said second valve means to said compressor for simultaneous operation with said clutch means.

11. The air flow control system as defined in claim 10 wherein said first and said second shutter means each include a plurality of louvers, said louvers of each said shutter means including a control bar operatively connecting said louvers for conjoint movement; said first actuator operatively connected to a first control bar for shifting the louvers associated with said first shutter means and said second actuator operatively connected to a second control bar for shifting the louvers associated with said second shutter means, said first and said second control bars being normally spaced apart, closing of said second control means in response to operation of said compressor allowing said second control bar to move into abutting relationship with said first control bar to thereby allow said louvers on said second shutter means to open a limited amount determined by the spacing between said first and said second control bars.

12. The air flow control system as defined in claim 1 wherein said first and said second shutter means each include a plurality of louvers, said louvers of each said shutter means including a control bar operatively connecting said louvers for conjoint movement; said first actuator operatively connected to a first control bar for shifting the louvers associated with said first shutter means and said second actuator operatively connected to a second control bar for shifting the louvers associated with said second shutter means, said first and said second control bars being normally spaced apart, closing of said second control means in response to operation of said compressor allowing said second control bar to move into abutting relationship with said first control bar to thereby allow said louvers on said second shutter means to open a limited amount determined by the spacing between said first and said second control bars.

13. The air flow control system as defined in claim 1 wherein said first and said second shutter means each include a plurality of louvers, said louvers of each said shutter means including a control bar operatively connecting said louvers for conjoint movement; said first actuator operatively connected to a first control bar for shifting the louvers associated with said first shutter means and said second actuator operatively connected to a second control bar for shifting the louvers associated with said second shutter means; lost motion linking means connecting said first and said second control bars; and stop means on one of said first and said second control bars engageable with said linking means, closing of said second control means in response to operation of said compressor allowing said linking means to move into abutting relationship with said stop means to thereby allow said louvers on said second shutter means to open a limited amount determined by said lost motion linking means.

14. In a vehicle having a radiator for cooling the engine, and an air conditioning system including a compressor, a condenser, and control means for the compressor, and a shutter assembly having a plurality of louvers shiftable between open and closed positions for controlling the flow of cooling air over the radiator and condenser, the improvement comprising:

said plurality of louvers being divided into two independent operable sections, each said section being biased into a normally open position;

operating means for said louvers, said operating means including a first control bar connecting a first independent section of said louvers for conjoint movement and a second control bar connecting a second independent section of said louvers for conjoint movement;

first and second fluid pressure actuator means operatively connected to said first and said second control bars respectively for shifting said bars and the louvers associated therewith toward a closed position;

means for connecting said first and said second actuator means to a common source of fluid pressure;

first normally opened control valve means in said connecting means for controlling the fluid pressure to said first and said second actuator means, the application of fluid pressure to said actuator means shifting said louvers to closed positions;

said first control valve means being responsive to predetermined engine temperatures to shift to closed position, blocking the flow of fluid pressure to said first and said second actuators thereby allowing said louvers to shift to said normally opened position;

second normally open control valve means in said connecting means for controlling the fluid pressure to said second actuator means, said second valve means including electrically operated means for shifting said valve into a closed position;

means connecting said electrically operated valve means to said control means for said compressor, operation of said compressor operating said electrically operated means in said second control valve means, to shift same to closed position thereby blocking flow of fluid pressure to said second actuator; and said first and said second control bars being normally spaced apart when said louvers are shifted between said positions; said second control bar being shiftable into abutment with said first control bar when said second control means is closed thereby opening said second independent section of said louvers a controlled limited amount.

* * * * *